United States Patent [19]

Yokozuka

[11] Patent Number: 5,041,751
[45] Date of Patent: Aug. 20, 1991

[54] MOUNTING SECTION STRUCTURE FOR MOUNTING A CIRCUIT BREAKER IN A BRUSH HOLDER STAY

[75] Inventor: Takashi Yokozuka, Aso, Japan

[73] Assignee: Mitsuba Electric Manufacturing Co., Ltd., Gunman, Japan

[21] Appl. No.: 540,486

[22] Filed: Jun. 19, 1990

[30] Foreign Application Priority Data

Jun. 19, 1989 [JP] . Japan .................................. 1-71475

[51] Int. Cl.$^5$ ......................... H02K 5/14; H02K 11/00
[52] U.S. Cl. .................................. 310/239; 310/68 C; 310/89
[58] Field of Search .............. 200/302.1; 310/43, 68 C, 310/71, 83, 239; 337/187, 372, 380

[56] References Cited

U.S. PATENT DOCUMENTS

| 4,572,979 | 2/1986 | Haar et al. | 310/43 |
| 4,727,274 | 2/1988 | Adam et al. | 310/71 |
| 4,734,602 | 3/1988 | Hauser et al. | 310/68 C |
| 4,742,199 | 5/1988 | Andis et al. | 200/302.1 |
| 4,851,730 | 7/1989 | Fushiya et al. | 310/71 |
| 4,978,876 | 12/1990 | Koster | 310/239 |

FOREIGN PATENT DOCUMENTS 2811503 12/1978 Fed. Rep. of Germany .... 310/68 C

Primary Examiner—Steven L. Stephan
Assistant Examiner—D. L. Rebsch
Attorney, Agent, or Firm—Oliff & Berridge

[57] ABSTRACT

A circuit breaker mounting section is provided for mounting a circuit breaker to a brush holder assembly in an electric motor. The mounting section is partitioned and formed so as to surround three sides of a circuit breaker with a partition wall projecting from the base plate of the brush holder assembly in a direction parallel to the axis of a motor core projecting through the assembly such that the outer surface side of the circuit breaker mounting section is open. The outer surface side opening of the breaker mounting section is surrounded and sealed by an inner side surface of a frame when the brush holder assembly is fitted and mounted in the frame.

8 Claims, 3 Drawing Sheets

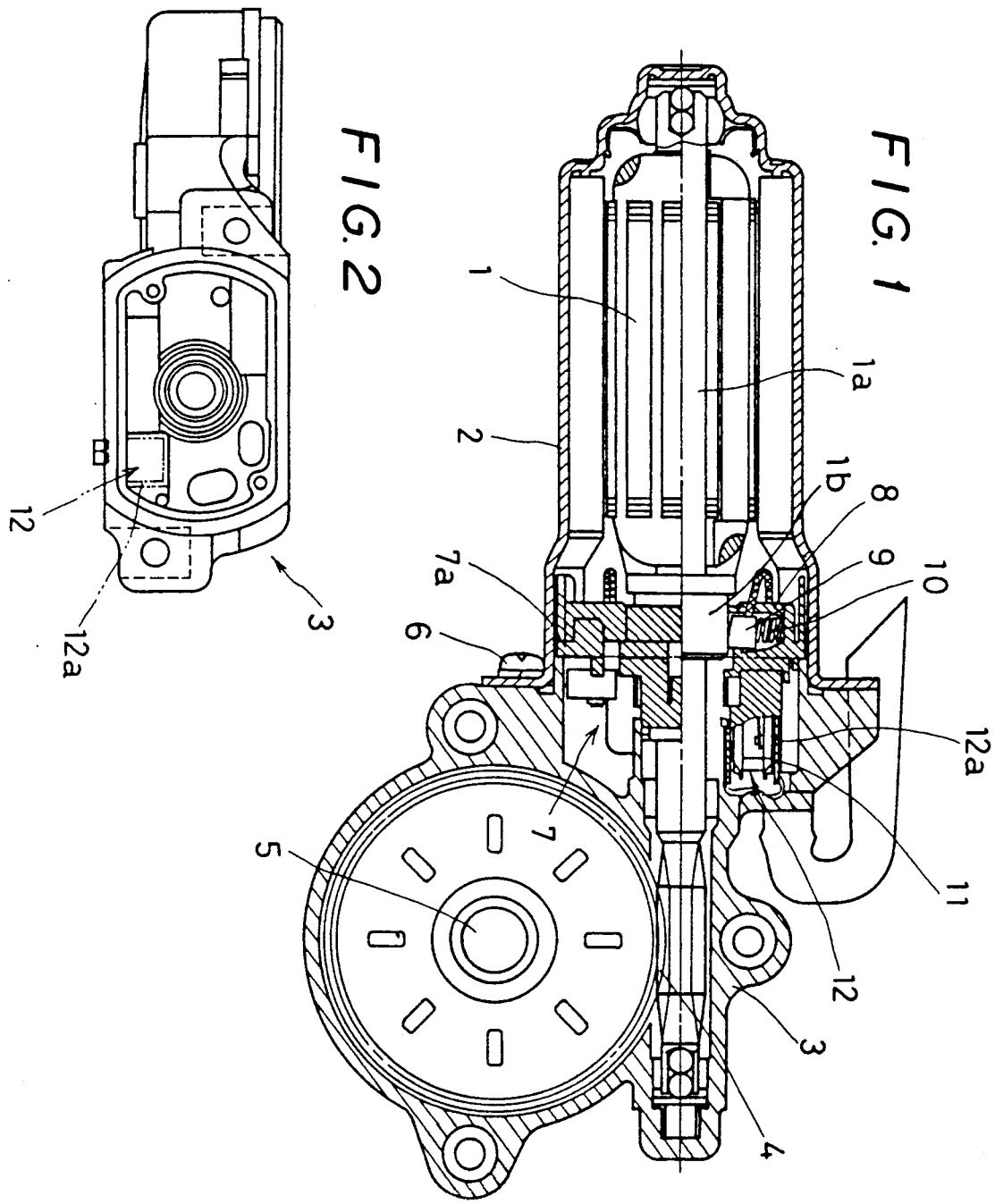

000
MOUNTING SECTION STRUCTURE FOR MOUNTING A CIRCUIT BREAKER IN A BRUSH HOLDER STAY

BACKGROUND OF THE INVENTION

The present invention relates to a mounting section structure for mounting a circuit breaker in a brush holder assembly.

In a motor of this type, generally, there is one construction in which a circuit breaker is disposed in the vicinity of a brush so as to protect a circuit line. There is a possibility in this motor that abrasive powder from the brush or a commutator will adhere to the contact point of a circuit breaker, thereby reducing the reliability of the circuit breaker. Hence, a circuit breaker is provided with a resin covering in the prior art, and this circuit breaker is mounted to a brush holder assembly. In this construction, a mounting space for a circuit breaker enlarged with a covering needs to be secured in the brush holder stay. The mounting space is formed by making a support plate project in the direction of the motor core axis so as to support all sides of the covering from the stay plate of the brush holder assembly. However, since the circuit breaker is enlarged because of its covering, a larger mounting space is needed by all means. For this reason, no room is available for the placement of other members than the brush holder assembly and a smaller type of motor cannot be constructed.

SUMMARY OF THE INVENTION

An object of the present invention is to provide a mounting section structure for mounting a circuit breaker in a brush holder assembly which is capable of eliminating the above-mentioned drawbacks.

In one aspect, the present invention is an improved mounting for a circuit breaker, comprising a base having a first side opposite to a second side and adapted to be mounted in an electric motor having a frame, said first side adapted to be in contact with an internal side of said frame and having means for mounting a circuit breaker, said mounting means including three partition walls extending outwardly from said first side and joined to one another along adjacent edges to form a U-shaped breaker mounting section adapted to be sealed on a fourth side by contact with said internal side, said second side adapted to cooperate with a position maintaining means for maintaining a brush at a desired position within said frame.

In another aspect, the present invention is an electric motor having the improved mounting.

These and other objects, features and advantages of the present invention will become clear when reference is made to the following description of the preferred embodiments of the present invention, together with reference to the accompanying drawings.

BRIEF DESCRIPTION OF THE DRAWINGS

FIG. 1 is a cross sectional view of a motor having one embodiment of the mounting section structure for mounting a circuit breaker in a brush holder assembly of the present invention;

FIG. 2 is a side view of a mounting section of the present invention;

DETAILED DESCRIPTION OF PREFERRED EMBODIMENTS

Figure 3A:
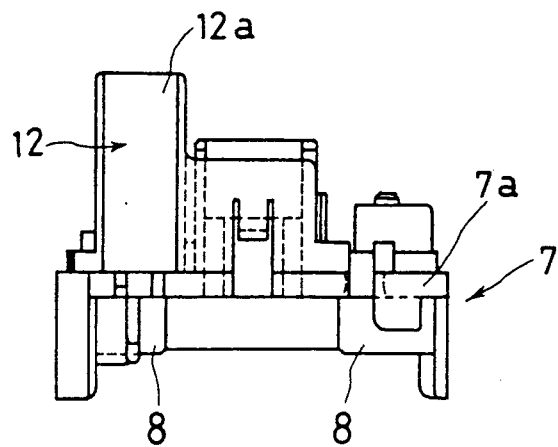
FIGS. 3A, 3B and 3C are a front v a top plan view and a bottom plan view of a brush holder assembly, respectively.

In forming a breaker mounting section for mounting a circuit breaker to a brush holder assembly in which a brush holder for holding a brush in slidable contact with a commutator, the breaker mounting section is partitioned and formed so as to surround the three quarters with a partition wall, a cross section of which is substantially U-shaped, which is made to project in a direction parallel to the axis of a core from the assembly base plate of a brush holder assembly in a state in which the outer surface side is open. Further, the opening at the outer surface side of the breaker mounting section is sealed and surrounded as the inner-side surface of a frame to which the brush holder assembly is fitted and mounted.

With this arrangement, the mounting space for a circuit breaker is made as small as possible in the present invention.

Next, an embodiment of the present invention will be explained with reference to the accompanying drawings. Shown in FIG. 1 is an armature core 1 for a power window. Both ends of a core axis (motor shaft) 1a are each rotatably supported by a yoke 2 and a frame 3. The front end of the core axis 1a is adapted to transfer power to the output axis 5 side via a worm gear mechanism 4. Numeral 6 denotes a screw for mounting the yoke 2 and the frame 3.

Also shown in the figure is a brush holder stay 7. One half section of the brush holder stay 7, which is formed in one side in a direction parallel to the axis of the core of a assembly base plate 7a, is fitted inwardly in a temporarily fixed state. The other half section is loosely engaged with the yoke 2 side. A brush holder 8 is formed in this other half section. A brush mounted inside this brush holder 8 is in slidable contact in a pressed form with a commutator 1b by the energized force of a spring 10. On the other hand, in the one half section of the brush holder stay 7 is formed a breaker mounting section 12 in which a circuit breaker 11 is mounted. That is, the breaker mounting section 12 is partitioned and formed as a result of the partition wall 12a being integrally projectedly formed from the, assembly base plate 7a. The partition wall 12a may have a substantially U-shaped cross section in such a manner as to surround three sides of a circuit breaker mounting section, excluding the, open outer surface side. The partition wall may be projectedly formed toward the front end in a direction parallel to the core axis. Further, the open outer surface side is sealed as a result of its opposing the inner surface of the frame 3 in a substantially sliding contact manner. As a result, all sides of the breaker mounting section 12 are surrounded.

Figure 4A:
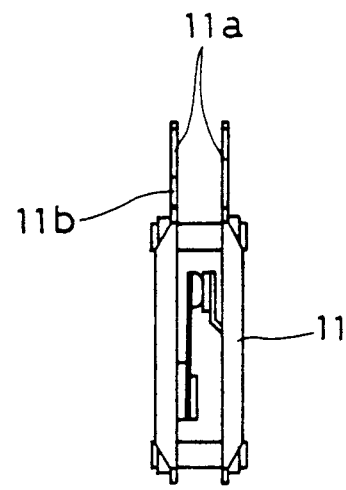
FIGS. 4A, 4B and 4C are a front view, a side view and a top plan view of a circuit breaker suitable for use with the present invention, respectively.
Figure 3B:
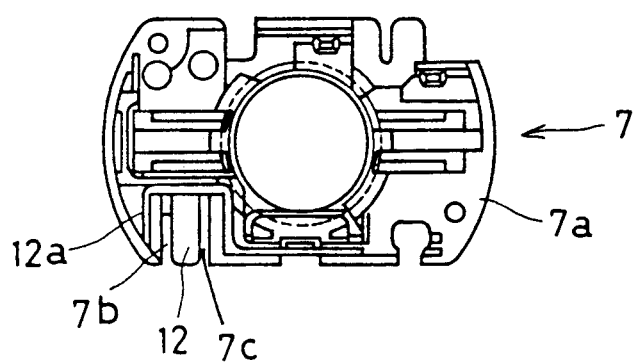
Figure 4B:
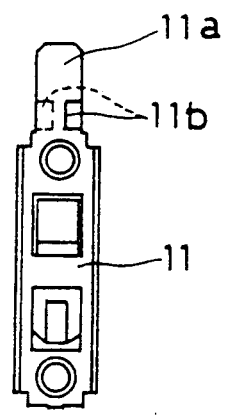
Figure 3C:
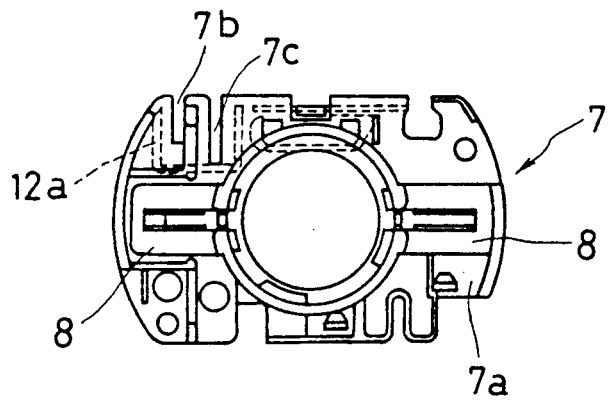
Figure 4C:
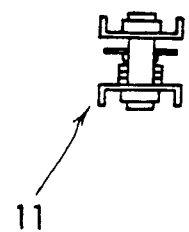
Figure 5A:
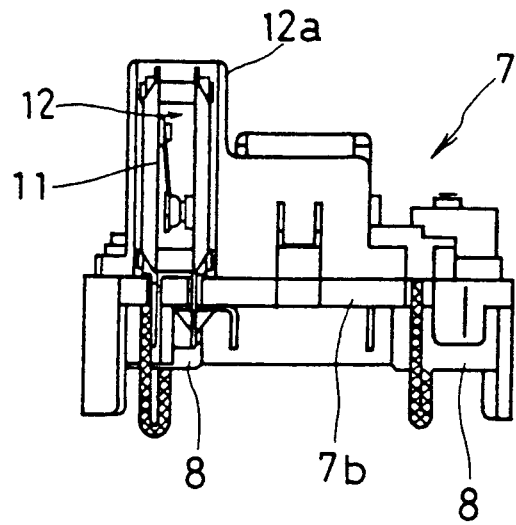
FIGS. 5A, 5B and 5C are a front view, a top plan view and a bottom plan view showing a state in which a brush and a circuit breaker are incorporated into the brush holder assembly, respectively.
Figure 5B:
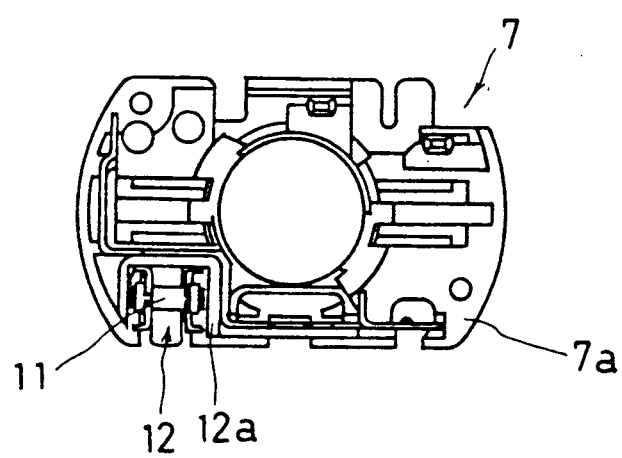
Figure 5C:
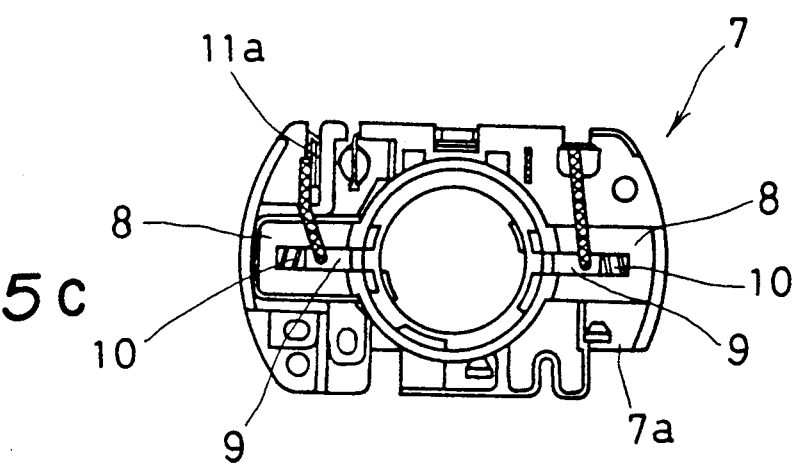
Figure 6:
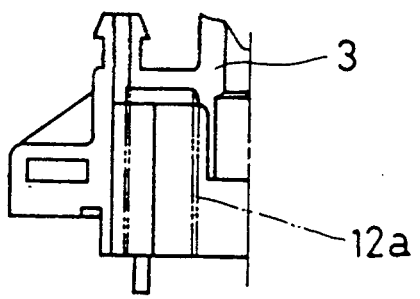
FIG. 6 is a cross sectional view of the portion of the breaker mounting section which is in sealing contact with a frame of an electric motor.

As shown in FIGS. 4A-B, a pair of terminal blocks 11a are projected in the circuit breaker 11. These are wired and connected to members such as lead wires and terminals in a state in which these terminal flat connectors 11a are fitted to mounting grooves 7b and 7c formed in a through form in the base plate 7a, as shown in FIG. 3. A notch 11b is formed in the terminal flat connectors 11a. The circuit breaker 11 is temporarily supported as the result of the notch 11b incorporated so as to make the notch 11b lock to the edge of the base plate mounting groove 7b. In this state, the above-mentioned wiring and connection of the circuit breaker 11 can be performed.

In the embodiment of the present invention constructed as described above, the circuit breaker 11 is installed in the brush holder assembly 7. The three sides of the breaker mounting section 12 are partitioned by the partition wall 12a projecting from the assembly base plate 7a of the brushholder assembly 7 and the remaining side of that is partitioned by the frame 3. As a result, abraded particles of the commutator 1b and the brush 9 can reliably be prevented from invading the breaker mounting section 12. Therefore, the circuit breaker 11 need not be provided with a covering as in the prior art. Not only can the number of parts be diminished with certainty, but the space occupied by the breaker mounting section 12 can be made smaller because a covering is not needed. This greatly aids in making a motor smaller and lighter.

In summary, according to the present invention, the circuit breaker is housed in a breaker mounting section partitioned and formed in a space in a sealed form, three sides of which are surrounded by a partition wall which projects from the stay base plate and the remaining one side of which is surrounded by the inner surface of a frame. Therefore, the circuit breaker is protected from adhesion of abrasive powder from a commutator or a brush even though it is not provided with a covering as in the prior art. As a result, a covering is not longer needed. Not only can the number of parts be diminished with certainty, but the space occupied by the breaker mounting section 12 can be made smaller because a covering is not needed. This greatly aids in making a motor smaller and lighter.

Many widely different embodiments of the present invention can be made without departing from the spirit and scope thereof. Therefore it is to be understood that this invention is not limited to the specific embodiments thereof except as defined in the appended claims.

What is claimed is:

1. An improved mounting for a circuit breaker, comprising
   a base having a first side opposite to a second side and adapted to be mounted in an electric motor having a frame,
   said first side adapted to be in contact with an internal side of said frame and having means for mounting a circuit breaker, said mounting means including three partition walls extending outwardly from said first side and joined to one another along adjacent edges to form a U-shaped breaker mounting section adapted to be sealed on a fourth side by contact with said internal side,
   said second side adapted to cooperate with a position maintaining means for maintaining a brush at a desired position within said frame.

2. The improved mounting of claim 1, wherein said mounting means further comprises a mounting groove formed on said first side and adapted to receive a mounting notch formed on a terminal flat connector of a circuit breaker.

3. The improved mounting of claim 2, wherein said mounting groove comprises a cut-out extending inwardly from an outer edge of said first side, said mounting means having a groove edge formed in said mounting groove, said groove edge adapted to lock the mounting notch of said terminal flat connector of said circuit breaker.

4. The improved mounting of claim 1, wherein said three partition walls are formed in one piece from said first side.

5. The improved mounting of claim 1, wherein said contact with said internal side comprises sliding contact.

6. An electric motor having the improved mounting of claim 1, and further comprising a brush in slidable contact with a commutator and a motor core having an axis.

7. The electric motor of claim 6, wherein said motor core has a U-shaped cross section.

8. The electric motor of claim 6, wherein said three partition walls extend outwardly in a direction parallel to said axis of said motor core.

* * * * *